Patented Oct. 10, 1944

2,359,863

UNITED STATES PATENT OFFICE 2,359,863

ORGANIC QUATERNARY AMMONIUM DERIVATIVES

Adrian Laverne Linch, Wilmington, Del., assignor to E. I. du Pont de Nemours & Company, Wilmington, Del., a corporation of Delaware No Drawing. Application July 20, 1942, Serial No. 451,682

5 Claims. (Cl. 260—544)

This invention relates to a new class of organic quaternary ammonium compounds and processes for their production.

It is an object of this invention to produce a new class of organic quaternary ammonium compounds having particular value as surface active agents, textile assistants, auxiliary agents in paper making, fungicides, insecticides, corrosion inhibitors, waterproofing agents and as intermediates in the production of the aforesaid compounds as well as in the production of dyes, pharmaceuticals and related products. A further object of the invention is to produce a new class of halogenated organic quaternary ammonium compounds having particular value in the aforesaid industries. A still further object is to produce quaternary ammonium compounds which, because of their peculiar properties, are not subject to the disadvantages of prior art pentavalent nitrogen derivatives. Additional objects will become apparent from a consideration of the following description and claims.

These objects are attained by the production of organic quaternary ammonium compounds having substituted thereon an acid halide grouping. In a more restricted sense this invention is concerned with organic quaternary ammonium compounds having substituted thereon at least one carboxylic acid halide and/or sulfonic acid halide grouping. In a still more restricted sense this invention pertains to betaine derivatives containing a chlorine or bromine atom attached to the acid radical of the betaine compound, and processes for their production. In its preferred embodiment this invention pertains to substitution products of betaines having a chlorine or bromine atom attached to the carbonyl component of the parent betaine compound.

The following representative examples, wherein the quantities are stated in parts by weight, are given to illustrate some of the many modifications embraced within the purview of this invention. The probable reaction which takes place in certain of these examples is set forth in the various equations referred to therein.

EXAMPLE 1

*N-chloro-betainyl chloride*

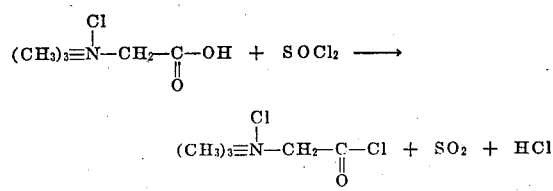

In an apparatus fitted with sealed agitation, reflux condenser and means for preventing entrance of atmospheric moisture, 1232 parts of betaine hydrochloride and 1140 parts of thionyl chloride are heated to 68° C. during a twenty minute period. A vigorous evolution of sulfur dioxide and hydrogen chloride sets in, and the granular charge changes to a paste. The temperature is maintained at 68–70° C. for 1½ hours. After approximately ten minutes on temperature, the mixture becomes quite fluid. At the end of the heating period, the pressure is reduced on the reaction vessel to remove excess thionyl chloride, and the melt allowed to cool and solidify under vacuum. In this manner, a quantitative yield of N-chloro-betainyl chloride which crystallizes at 64° C. is obtained. Per cent Cl found 41.2; theory 41.3 and per cent N found 7.68; theory 8.12.

Other chlorinating agents such as phosphorus pentachloride, phosphorus trichloride, chlorosulfonic acid, etc. yield similar results. By using the corresponding bromides such as thionyl bromide, phosphorus pentabromide, etc. N-chloro-betainyl bromide is obtained. In the presence of an excess of the brominating agent, the chlorine atom associated with the nitrogen atom is displaced by mass action to produce the corresponding N-bromo-betainyl bromide.

It is not necessary to start with an acid salt of betaine to produce N-chloro-betainyl chloride. Betaine itself condenses with one mole equivalent of thionyl chloride or phosphorus pentachloride as follows:

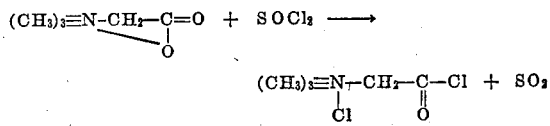

However, betaine hydrate requires two molecular equivalents of halogenating agent.

EXAMPLE 2

*N-chloro-(N'-chloro-betainyl)-betainyl chloride*

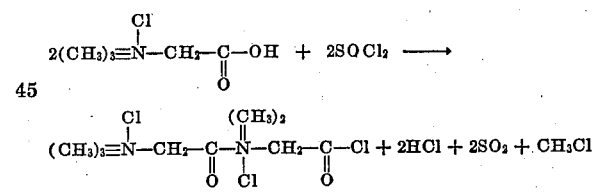

A mixture of 385 parts of betaine hydrochloride suspended in 615 parts of dry benzene is heated to boiling under reflux. Over a 2-hour period, a solution of 417 parts of thionyl chloride dissolved in 275 parts of benzene is added. The mixture is held on temperature 6½ hours, then over a 2½ hour period an additional 180 parts of thionyl chloride is added, on temperature. After refluxing 3 hours, the mixture is filtered hot, and the filter cake washed with 275 parts of dry benzene. The product is finally dried in a vacuum desiccator or drying oven. 285 parts of product melting at 134–141° C. (with decomposition) is obtained. Per cent Cl found 36.5; theory 36.3.

Similar results are obtained by using other chlorinating agents such as phosphorus pentachloride, and the use of brominating agents such as thionyl bromide, phosphorus tribromide, etc. produces the corresponding N-chloro-(N'-chloro-betainyl)-betainyl bromide. The chlorine atoms can be displaced from the quaternary ammonium nitrogen atoms by employing an excess of the brominating agent.

EXAMPLE 3

Betainyl chloride hydrogen sulfate

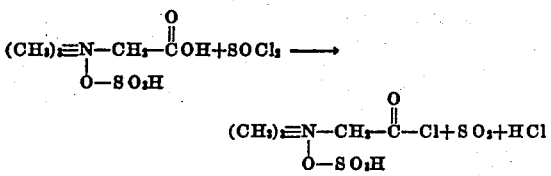

Twenty-two parts of betaine hydrogen sulfate is suspended in 44 parts of dry benzene. Then, under good agitation, 36 parts of thionyl chloride is added. A vigorous evolution of gas takes place and the temperature drops 5–10° C. During a 30 minute interval, the mixture is heated to 72° C. and held at 72–77° C. for one hour. At this point the product is a paste heavier than benzene. After cooling to room temperature, the solvent is removed by decantation, the crystalline product is washed with 90 parts of dry benzene and finally dried over magnesium oxide in a vacuum desiccator. 20.5 parts of high purity betainyl chloride hydrogen sulfate is obtained. Per cent sulfur found 14.68; theory 14.87.

Similar results are obtained by using other salts of betaine such as betaine nitrate, thiocyanate, hydrogen phosphate, chlorate, perchlorate, fluoride, acetate, benzoate, benzene sulfonate, metho-sulfate, phthalate, succinate, picrate, iodide, nitrite, and complex salts such as the ferricyanide, phospho-tungstate, phosphomolybdate, silico fluoride, etc. In the presence of an excess of thionyl chloride, some salts such as betaine acetate may disproportionate to yield N-chloro-betainyl-chloride.

The betainyl bromide salts are prepared as described in Examples 1 and 2, and the fluoride may be prepared by treating the chloride with concentrated hydrofluoric acid.

EXAMPLE 4

N-chloro-C-tetradecyl betainyl chloride

Ten parts of C-tetradecyl betaine, prepared according to the method described in Example 1 of U. S. P. 2,129,264 and melting at 184–186° C., is suspended in 105 parts of anhydrous benzene. To this suspension, under agitation and over a 45 minute time interval, a solution of 4.88 parts of thionyl chloride dissolved in 26 parts of dry benzene is added. The reaction is somewhat exothermic and the product is soluble in benzene. The mixture is heated to boiling under reflux over a 1½ hour period. The excess thionyl chloride and benzene are then removed under reduced pressure at 40–45° C. The residue is extracted with 300 parts of petroleum ether in 3 aliquot portions and dried under vacuum. A yield of 8.8 parts of product which melts at 100–101° C. and exhibiting the usual properties of aliphatic acid chlorides is obtained.

Other C-substituted betaines such as C-ethyl, C-butyl, C-heptyl, C-decyl, C-hexadecyl, C-phenyl, C-benzyl, etc. betaine complexes are also converted to the corresponding acid chlorides by chlorinating agents such as thionyl chloride, phosphorus trichloride, etc., or to the acid bromides by the analogous brominating agents. Further, it is not necessary to employ a diluent, but the condensation proceeds equally well in the absence of solvent as described in Example 1.

The inorganic acid salts of C-substituted betaines such as alpha (N-bromo-pyridyl)-stearic acid

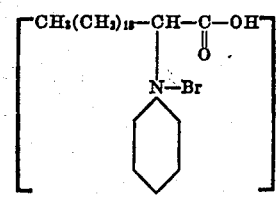

also are easily converted to the corresponding acid chloride or bromide by the herein described methods.

EXAMPLE 5

N-chloro-N-benzyl-betainyl chloride

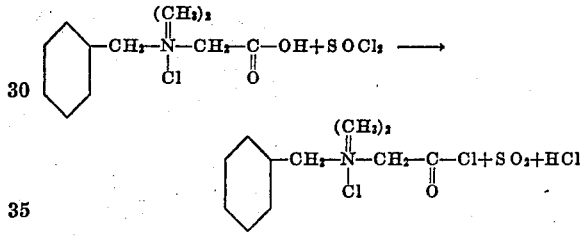

Twenty-five parts of N-benzyl betaine hydrochloride (synthesized by a condensation of benzyl chloride with sodium dimethyl glycinate, followed by acidification with hydrochloric acid, and melting at 161–162° C.) is suspended in 22 parts of anhydrous benzene. 36.1 parts of thionyl chloride is added to this suspension under agitation. Within ten minutes a vigorous gas evolution sets in and two liquid phases are formed. The mixture is heated to 70° C. in an hour, and the solvent and excess thionyl chloride removed by reducing the pressure on the reaction vessel. A theoretical yield of product which slowly crystallizes on standing is obtained. Percent N found 5.71; theory 5.64.

By substituting an equivalent weight of N-phenyl betaine hydrochloride (N-methyl phenyl glycine metho-chloride), prepared by condensing chloro-acetic acid with dimethyl aniline (Beilstein XII, 475, M. P. 194–196° C.), a nearly quantitative yield of the corresponding N-chloro-N-phenyl betainyl chloride is obtained.

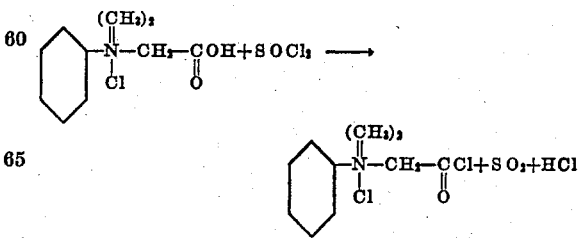

The benzyl or phenyl group may contain one or more additional groups such as alkyl (methyl, ethyl, butyl, hexadecyl, etc.), additional fused rings (naphthyl), halogen, nitro, acetylated amino, carboxylic acid (and its derivatives such as amide, ester, etc.), hydroxyl, sulfonic, sulfonamido, mono or dialkylamino, quaternary ammonium, etc. For example, para-nitrobenzyl bromide condenses with dimethyl glycine to give para-nitrobenzyl betaine hydrobromide which is converted to the N-bromo-para-nitrobenzyl betainyl chloride by thionyl chloride as described above. Aromatic betaine derivatives which contain a carboxylic acid group in the aryl nucleus are converted by excess thionyl chloride into the di-acid chloride, i. e.,

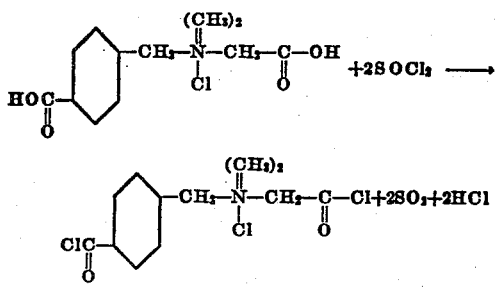

This condensation of N-substituted betaines with halogenating agents to produce the corresponding N-halo-N-substituted betainyl halides is applicable to a variety of types of substitution products. The following additional quaternary ammonium compounds are but a few members of this group which serve to illustrate:

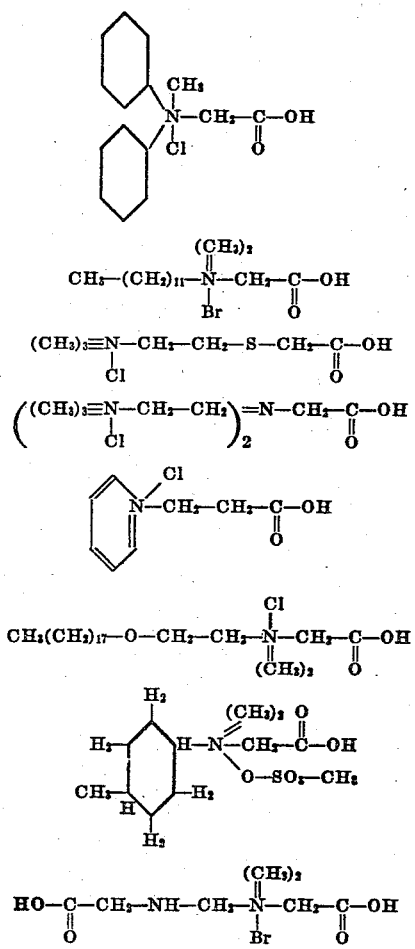

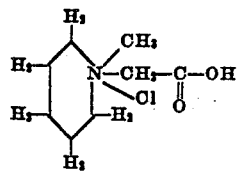

EXAMPLE 6

X(N-chloro-trimethylamino-methyl)-beta-naphthoyl chloride

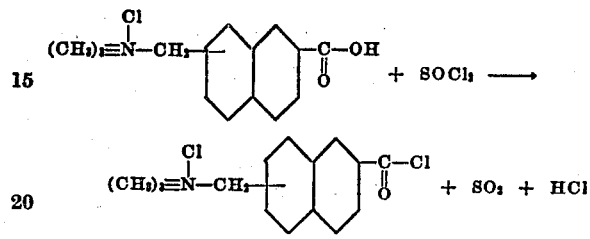

Fourteen parts of X(trimethylamino)-methyl-beta-naphthoic acid chloride (prepared by condensing beta-naphthoic acid with formaldehyde and hydrochloric acid followed by quaternization of the X-chloromethyl beta-naphthoic acid in alcoholic trimethylamine solution, M. R. 248–249° C.) is suspended in 22 parts of dry benzene containing 18.1 parts of thionyl chloride. The reaction is exothermic, but requires 5 hours at 76–81° C. under reflux to complete. The product is recovered by filtration, washed with dry benzene and dried in a vacuum desiccator. A yield of 14 parts of X(N-chlorotrimethylamino)-methyl-beta-naphthoyl chloride is obtained. Analysis: M. P.=255° C.—percent nitrogen: found 4.72; theory 4.66.

It is at once obvious that the foregoing condensation can be applied to a variety of quaternary ammonium substituted aromatic carboxylic acids to produce a large number of quaternary ammonium aromatic carbonyl chlorides of which the following quaternary ammonium compounds are a few representative examples:

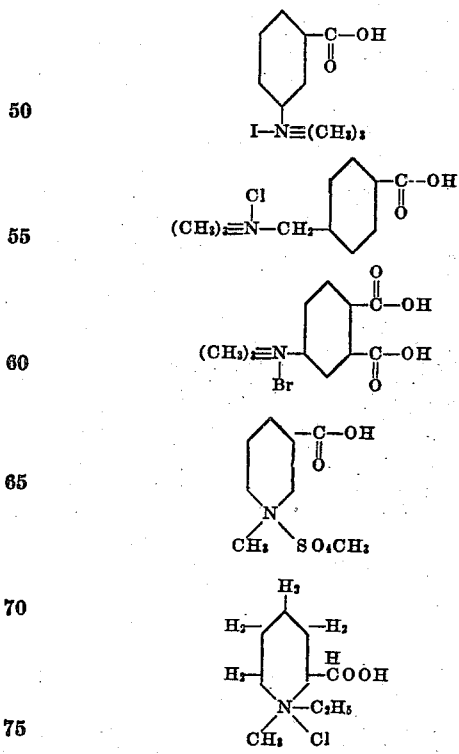

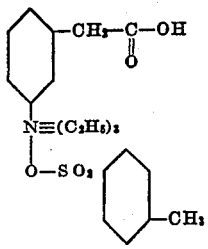

Example 7

*Meta-(omega-N-chloro-pyridyl-acetyl)-amino-benzoyl chloride*

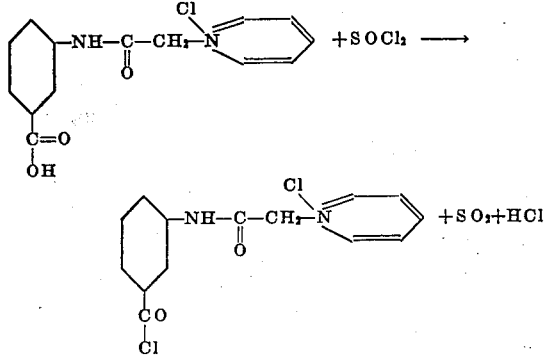

129 parts of meta (omega pyridyl acetyl) amino benzoic acid chloride (synthesized by condensing meta-amino-benzoic acid with chlor-acetyl chloride in pyridine) is mixed with 220 parts of benzene and 181 parts of thionyl chloride. The mixture is heated in 10 to 15 minutes to 75–76° C. and held on temperature under reflux for 6 hours. The solvent is removed by decantation and the product dried in vacuo. A quantitative yield of meta (omega-N-chloro-pyridyl acetyl) amino benzoyl chloride melting at 227° C. is obtained.

As pointed out in the foregoing examples, the synthesis of meta (omega-N-chloro-pyridyl acetyl) amino benzoyl chloride is but one member of a large group of derivatives which can be prepared in this manner. Additional representative examples are illustrated by the following structural formulas:

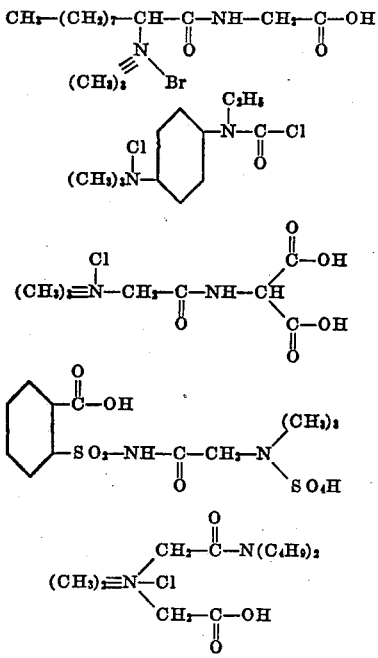

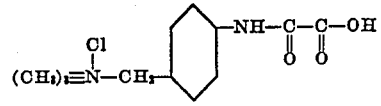

Example 8

*N-chloro-sulfo-betainyl chloride*

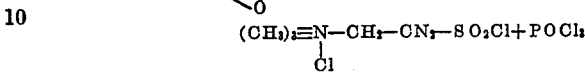

Twenty-five parts of sulfobetaine (prepared by condensing beta-bromo-ethane sodium sulfonate with trimethylamine in methyl alcohol at 160° C.) is mixed with 49.2 parts of phosphorus pentachloride. Reaction begins at once and the mixture is rapidly reduced to a viscous syrup with the evolution of heat. The reaction mixture is heated to 115° C., allowing the phosphorus oxy chloride to distill off. The temperature is held at 110–115° for one hour; then the pressure is reduced on the reaction vessel to remove last traces of volatile by-products. A nearly qualitative yield of N-chloro-sulfobetainyl chloride is recovered after drying in vacuo.

In a similar manner, N-substitution and C-substitution products of sulfobetaine in general can be converted to the corresponding sulfo betainyl chlorides or bromides. The following examples are but a few representative structures which serve to indicate the scope of this condensation:

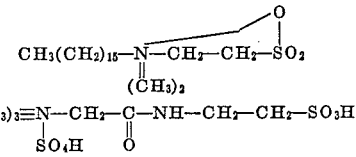

Trimethyl ammonium bromo cetane sulfonate (obtained by bromination of cetene sulfonic acid followed by a reaction with trimethylamine).

Dimethyl cetyl ammonium butane sulfonate

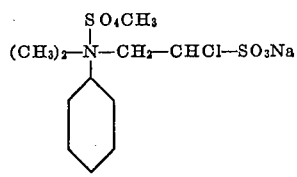

Example 9

*Phenyl benzyl dimethyl ammonium sulfate sulfone chloride*

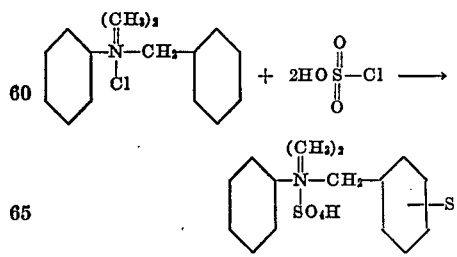

Fifty parts of phenyl benzyl dimethyl ammonium chloride (prepared by condensing benzyl chloride with dimethylaniline in alcohol) is suspended in 240 parts of tetrachloro-ethane. Fifty-nine parts of chlorosulfuric acid is run into this suspension under good agitation during 10 minutes time interval. The reaction is exothermic and hydrogen chloride is released. The mixture is heated to 56° C. during 1½ hours and held at 56–62° C. for 1½ hours. The mixture is cooled to room temperature and the two liquid phases separated. The lower solvent layer is discarded, or used in a subsequent chlorination. The product is freed of solvent under vacuum on a steam bath. A theoretical yield of phenyl benzyl dimethyl ammonium sulfate sulfon chloride is obtained as an oil. By substituting bromosulfonic acid or fluorosulfonic acid in place of chlorosulfonic acid, the corresponding phenyl benzyl dimethyl ammonium sulfate sulfonyl bromide or fluoride is obtained. Other inert solvents such as carbon tetrachloride, ortho-dichlorobenzene, dioxane, nitrobenzene, kerosene, etc. produce equally good results.

The above method for the manufacture of quaternary ammonium sulfon halides is applicable in general to derivatives susceptible to sulfonation. The following additional examples indicate the utility of this process in the preparation of quaternary amonium sulfon halides:

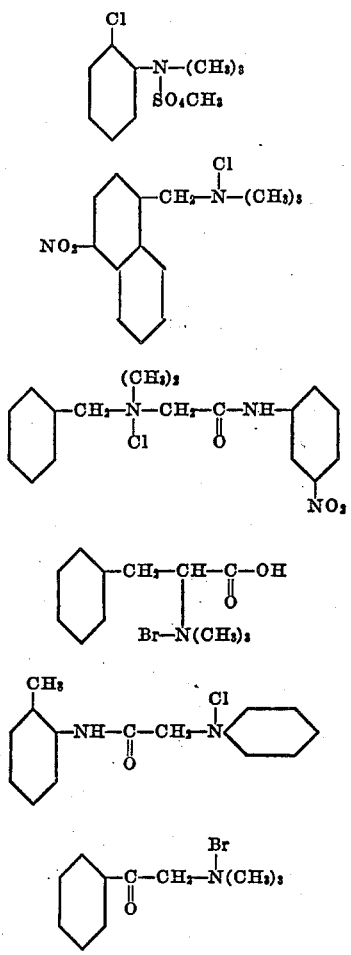

However, the methods for the preparation of aryl quaternary ammonium sulfon chloride is not confined to the use of chlorosulfonic acid as a chlorosulfonating agent with aryl quaternary ammonium derivatives. Equally good results are obtained by condensing aryl quaternary ammonium sulfonic acids with agents, such as phosphorus pentachloride, usually employed in producing sulfon halides. For example, dimethyl phenyl parasulfobenzyl ammonium chloride (prepared by condensing parachloromethyl benzene sulfonic acid with dimethyl aniline) heated with phosphorus pentachloride yields the corresponding dimethyl phenyl benzyl ammonium chloride sulfon chloride, i. e.,

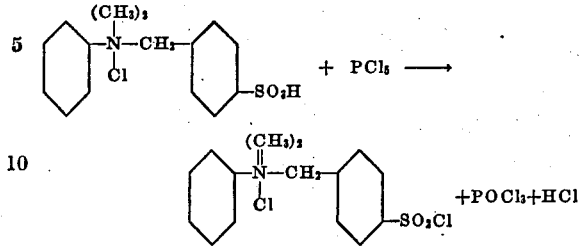

or anhydro para-sulfophenyl trimethyl ammonium hydroxide heated with phosphorus pentachloride yields para-chloro-sulfonyl phenyl trimethyl ammonium chloride, i. e.,

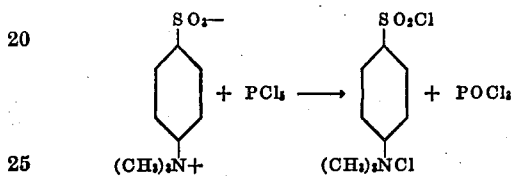

Aryl derivatives containing more than one group capable of undergoing conversion to sulfonyl and/or carbonyl chlorides in the presence of an excess of thionyl chloride, phosphorus pentachloride, etc., yield poly acid chloride derivatives, i. e.,

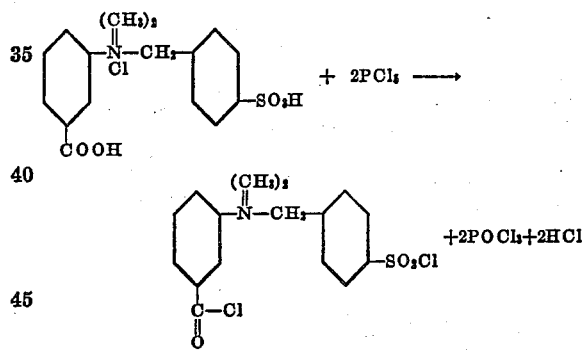

EXAMPLE 10

*Bentainyl chloro-formate chloride*

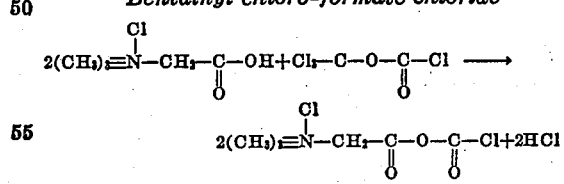

Suspend 15.4 parts of betaine hydrochloride in 58 parts per-chlormethyl formate, and under efficient agitation, heat to 92° C. during 45 minutes. At 75° C., hydrochloric acid is evolved, and a chilled condenser is used to return phosgene which forms during the reaction. After heating for 3 hours, the phosgene is allowed to evaporate, and the product dried under vacuum. 16.5 parts of quite pure betainyl chloro formate chloride is obtained. Per cent nitrogen: found 6.42; theory 6.37.

Other carbon and nitrogen substituted derivatives (see preceding examples for types and specific structures) react in a similar manner with perchlormethyl formate, phosgene or carbonyl bromide to produce the corresponding substituted betainyl chloro formate chlorides, or betainyl bromo formate chlorides. In addition the following derivatives are prepared by condensations with carbonyl halides:

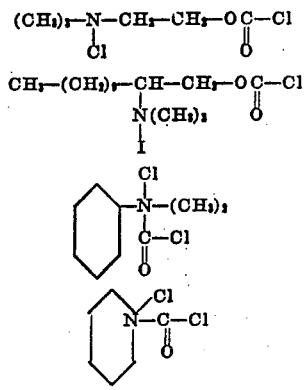

It is to be understood that the foregoing examples are illustrative merely of a few of the numerous modifications embraced within the scope of this invention. The various reactants and the conditions of reaction may be changed widely without departing from the scope of this invention.

Temperatures at which the desired reactions are carried out may vary widely. As a general rule temperatures within the range of about −80° C. to about +150° C. may be used with satisfactory results. For optimum results over a wide range of reactants and conditions the preferred temperatures are between room temperature and 100° C., although they may vary somewhat outside that range depending upon the reactivity of the compounds employed.

Normal atmospheric pressure is customarily employed, but it is to be understood that the use of subatmospheric or superatmospheric pressures is contemplated. It is frequently convenient to reduce the pressure at the end of the reaction, especially when diluents are not used, in order to facilitate the removal of by-products and excess reagents.

The proportion of reactants used may be varied widely from the stoichiometric limits indicated by the particular reaction. An excess of from 10–50% of halogenating compound may be employed in order to insure a complete reaction, if desired. In the event that more than one acid group, such as carboxylic or sulfonic acid, is present more than one molecular equivalent of halogenating reagent will obviously be necessary to obtain complete conversion of the acid groups to the corresponding acid halides. It should be understood, however, that it is not always necessary to convert all of the acid groups to acid halides.

In the absence of dehydrating agents, it is frequently advisable to use more than one molecular equivalent of halogeno sulfonic acid for each sulfon halide group introduced into the product, due to the fact that the water produced as a by-product of the reaction may hydrolyze part of the halogeno sulfonic acid. Where a large excess of halogeno sulfonic acid is employed more than one sulfon halide group may be introduced into the resulting compound, and in certain instances this may further improve the characteristics of such compounds.

Quaternary ammonium compounds which may be used, in accordance with this invention, are exceedingly varied and offer a wide latitude of choice. These compounds may contain an acid radical capable of reacting with the halogenating agent, or in the alternative the halogenating agent may contain the acid radical and be of such type that both the acid radical and the halogen atom are affixed to the quaternary ammonium compound by the reaction.

Many of the quaternary ammonium compounds embraced within the ambit of this invention may be designated by the following general formula:

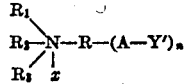

in which R=a bifunctional organic radical connecting N with A. Examples of such groups are alkylene, cyclo-alkalene, aralkylene, arylene, heterocyclic or two or more such groups which are like or unlike connected by

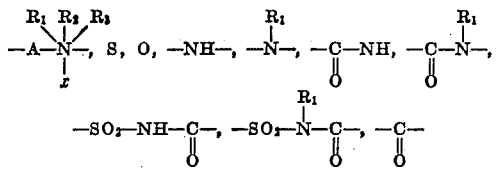

and their substitution products such as halogeno, nitro, nitroso, carboxyl, sulfonic, halogeno alkyl, alkoxy, etc.

$R_1$, $R_2$, $R_3$=alkyl, cyclo-alkyl, aralkyl, aryl, heterocyclic, $R_1$ and $R_2$ together with N form a heterocyclic ring or $R_1$, $R_2$ and $R_3$ together with N form a heterocyclic ring, and their substitution products.

X=anion
Y=fluorine, chlorine, or bromins

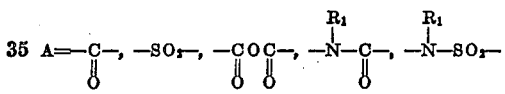

n=a small, whole number.

Quaternary ammonium compounds conforming to the aforesaid general formula may be converted to the desirable products of this invention by condensation with halogenating agents such as thionyl chloride, thionyl bromide, phosphorus penta bromide, phosphorus pentachloride, phosphorus tribromide, phosphorus trichloride, chlorosulfonic acid, etc. In general, it may be stated that the inorganic halides known in the art and previously used for converting organic sulfonic or carboxylic acids to sulfonyl or carbonyl halides are useful for this purpose.

As is clear from the foregoing description, the term "halogenating agent" is used herein to mean a reagent which introduces halogen by the displacement of a hydroxyl radical from an organic carboxylic or sulfonic acid group, or the like, rather than one which displaces hydrogen.

Instead of the acid group being present on the quaternary ammonium derivative it is possible for this group to be present on the halogenating compound. For instance, an organic quaternary ammonium derivative which is capable of sulfonation may be condensed with a halogeno sulfonic acid such as chlorsulfonic in order to produce the corresponding quaternary ammonium substituted sulfon halide. In the same manner the aforesaid quaternary ammonium derivative may be condensed with a carbonyl halide such as phosgene to produce a quaternary ammonium substituted carbonyl halide derivative. In place of phosgene a perhalogen formate, such as perchlormethyl formate, may be employed. It should be noted that in operations involving carbonyl halides cooling below room temperature is frequently advisable in order to reduce the violence of the reaction and to prevent loss of the reagent.

It is to be understood that mixtures of two or more quaternary ammonium derivatives and/or two or more halogenating compounds may be employed without departing from the scope of this invention. By the use of such mixtures resulting products are obtained wherein the advantages of the individual components may be enhanced.

By means of the present invention quaternary ammonium derivatives of appreciable value in the industrial arts are produced. These compounds are valuable intermediates for the solubilization of many dyes, dye intermediates, pharmaceuticals, insecticides, surface active agents, textile assistants, auxiliary agents in paper manufacture, resist agents for vat printing and other printing assistants, waterproofing agents, corrosion inhibitors, fungicides, etc. Likewise, they are capable of advantageous use in the synthesis of the aforesaid products. Furthermore, they permit the manufacture of many new products and provide a simple and inexpensive means of making numerous known products. They are capable of wide use in the production of esters, amides and other derivatives substituted by pentavalent nitrogen unsubstituted by hydrogen.

As many apparently widely different embodiments of this invention may be made without departing from the spirit and scope thereof, it is to be understood that the invention is not limited to the specific embodiments thereof except as defined in the appended claims.

I claim:
1. A betaine acid halide represented by the following formula:

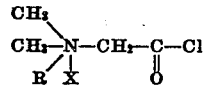

wherein R represents a hydrocarbon group, and X represents an anion of a strong acid.

2. The products of claim 1 wherein X represents halogen.
3. N-chloro-betainyl chloride.
4. N-chloro-N-benzyl-betainyl chloride.
5. N-chloro-N-phenyl-betainyl chloride.

ADRIAN LAVERNE LINCH.